US012703189B2

(12) United States Patent
Xu et al.

(10) Patent No.: US 12,703,189 B2
(45) Date of Patent: Aug. 11, 2026

(54) PRINTER ASSEMBLY WITH COMMON MODULE

(71) Applicant: Hand Held Products, Inc., Charlotte, NC (US)

(72) Inventors: Chang Xu, Charlotte, NC (US); Ramanathan Alaganchetty, Charlotte, NC (US); Tiecheng Qu, Charlotte, NC (US)

(73) Assignee: Hand Held Products, Inc., Charlotte, NC (US)

( * ) Notice: Subject to any disclaimer, the term of this patent is extended or adjusted under 35 U.S.C. 154(b) by 200 days.

(21) Appl. No.: 18/413,278

(22) Filed: Jan. 16, 2024

(65) Prior Publication Data

US 2024/0253364 A1 Aug. 1, 2024

(30) Foreign Application Priority Data

Jan. 30, 2023 (CN) ......................... 202310052755.5

(51) Int. Cl.
*B41J 2/325* (2006.01)
*B41J 29/13* (2006.01)

(52) U.S. Cl.
CPC ............... *B41J 2/325* (2013.01); *B41J 29/13* (2013.01)

(58) Field of Classification Search
CPC ... B41J 2/325; B41J 29/13; B41J 29/02; B41J 29/38; B41J 3/00; B41J 29/393
See application file for complete search history.

(56) References Cited

U.S. PATENT DOCUMENTS

| | | | | |
|---|---|---|---|---|
| 7,042,478 B2 * | 5/2006 | Bouverie | ............. | B41J 11/0095 347/177 |
| 2013/0016368 A1 * | 1/2013 | Bouverie | ................. | B41J 17/36 358/1.6 |

FOREIGN PATENT DOCUMENTS

| | | |
|---|---|---|
| CN | 211868930 U | 11/2020 |
| KR | 10-0581353 B1 | 5/2006 |

OTHER PUBLICATIONS

Honeywell, PC42t Desktop Printer User Guide, 73 pgs., (2015-2018).

* cited by examiner

*Primary Examiner* — Ricardo I Magallanes
*Assistant Examiner* — Tracey M Mcmillion
(74) *Attorney, Agent, or Firm* — Alston & Bird LLP

(57) ABSTRACT

A printer assembly that includes a module and a first set of drive components is provided. The module includes a plurality of ports that are configured to be removably coupled to a corresponding drive component of the first set of drive components and further configured to be removably coupled to a corresponding drive component of a second set of drive components. Each of the drive components of the first set of drive components are of a different size than each of the drive components of the second set of drive components.

19 Claims, 3 Drawing Sheets

PRINTER ASSEMBLY WITH COMMON MODULE

CROSS-REFERENCE TO RELATED APPLICATIONS

This application claims priority pursuant to 35 U.S.C. 119(a) to Chinese application Ser. No. 202310052755.5, filed Jan. 30, 2023, which application is incorporated herein by reference in its entirety.

TECHNICAL FIELD

The present application relates generally to a printer assembly. More specifically, the present application relates generally to a printer assembly that includes a common module that can be used with drive components, printing media, or printing ribbon of different sizes.

BACKGROUND

Printer assemblies often include a module and drive components that extend from the module. Modules often include electronic hardware and an electric motor that can rotate at least one of the drive components. The drive components can facilitate the use of printing media (e.g., paper, labels, tickets, tags, continuous stock) or printing ribbon (e.g., thermal transfer ribbon). For example, one of the drive components is often a spool to dispense or rewind the printing media or the printing ribbon, which can be rotated by the electric motor.

The module is often manufactured and preprogrammed to work with a particular size of drive components, printing media, or printing ribbon. It is often not easy to adapt the module to work with different sized drive components, printing media, or printing ribbon. For example, a module that was manufactured and preprogrammed to work with four inch printing media or printing ribbon may not work with six inch printing media or printing ribbon without remanufacturing or reprogramming the module. More specifically, the chassis of the module may need to be remolded or the electronic hardware and connection parts may need to be redesigned, adjusted, or reprogrammed. Additionally, it is often necessary to adjust the torque output by the electronic motor to work with the drive component, printing media, or printing ribbon of a differing size. As such, a printer assembly with a common module to easily work with various sizes of drive components, printing media, or printing ribbon would be welcomed in the art. Through applied effort, ingenuity, and innovation, many of these identified deficiencies and problems have been solved by developing solutions that are structured in accordance with the embodiments of the present disclosure, many examples of which are described in detail herein.

BRIEF SUMMARY

In general, embodiments of the present disclosure provided herein include systems and apparatuses to provide for improved printer assemblies. More specifically, the modules of the printer assemblies disclosed herein may easily work with drive components, printing media, or printing ribbon of various sizes.

In various aspects, a printer assembly includes a module that includes an electric motor and a plurality of ports, and a plurality of drive components. Each of the plurality of drive components can be configured to be removably coupled to a corresponding port of the plurality of ports. The electric motor can be configured to rotate at least one of the plurality of drive components. The module can be configured to receive, sense, or determine information related to at least one of the plurality of drive components and configured to adjust at least one of a rotational speed or a torque output by the electric motor based on the information related to the at least one of the plurality of drive components. In various example, the printer assembly includes a motion control printed circuit board (PCB), main logic boards, and a power supply.

In various examples, the electric motor can be configured to rotate a first one of the plurality of drive components and the module can be configured to receive, sense, or determine information related to a second one of the plurality of drive components. The second one of the plurality of drive components can be a printhead. The module can be configured to sense, receive, or determine the information related to the printhead by receiving information from a chip that can be attached to the printhead. The information related to the at least one of the plurality of drive components can be a length of the at least one of the plurality of drive components. In various examples, factory settings will be preset indicated the model of the drive components or the width of the drive components.

In various aspects, a printer assembly includes a module includes a plurality of ports, and a first set of drive components. Each of the plurality of ports can be configured to be removably coupled to a corresponding drive component of the first set of drive components and further configured to be removably coupled to a corresponding drive component of a second set of drive components. Each of the drive components of the first set of drive components can have a different size than each of the drive components of the second set of drive components.

In various examples, the module can be configured to determine whether a drive component of the first set of drive components is coupled to the module or a drive component of the second set of drive components is coupled to the module. Each of the plurality of ports can be configured to be removably coupled to the corresponding drive component of the first set of drive components and removably coupled to the corresponding drive component of the second set of drive components at different instances of time.

In various examples, each of the drive components of the first set of drive components can have a length that differs from a length of each of the drive components of the second set of drive components by at least one inch. For example, the length of each of the drive components of the first set of drive components can be at least three inches and up to five inches and the length of each of the drive components of the second set of drive components can be at least five inches and up to seven inches. In various examples, each of the plurality of ports can be further configured to be removably coupled to a corresponding drive component of a third set of drive components. A length of each of the drive components of the third set of drive components can be at least seven inches and up to nine inches.

In various examples, the module further includes an electric motor. The module can be configured to cause the electric motor to output a first torque when the first set of drive components is removably coupled to the module and output a second torque when the second set of drive components is removably coupled to the module. The second torque can be greater than the first torque.

In various aspects, a printer assembly includes a module includes a plurality of ports, a first set of drive components, and a first cover removably coupled to the module and configured to house the first set of drive components. Each of the plurality of ports can be configured to be removably coupled to a corresponding drive component of the first set of drive components and further configured to be removably coupled to a corresponding drive component of a second set of drive components. Each of the drive components of the first set of drive components can have a different size than each of the drive components of the second set of drive components.

In various examples, the module can be configured to be removably coupled to a second cover. The second cover can have a different width than the first cover. The module can be configured to be removably coupled to the first cover and to the second cover at different instances of time. The module can be configured to determine whether a drive component of the first set of drive components is coupled to the module or a drive component of the second set of drive components is coupled to the module. In various examples, each of the plurality of ports can be configured to be removably coupled to the corresponding drive component of the first set of drive components and removably coupled to the corresponding drive component of the second set of drive components at different instances of time.

In various examples, each of the drive components of the first set of drive components can have a length that differs from a length of each of the drive components of the second set of drive components by at least one inch. In various examples, the length of each of the drive components of the first set of drive components can be at least three inches and up to five inches and the length of each of the drive components of the second set of drive components can be at least five inches and up to seven inches.

In various examples, the module further includes an electric motor. The module can be configured to cause the electric motor to output a first torque when the first set of drive components is removably coupled to the module and output a second torque when the second set of drive components is removably coupled to the module. The second torque can be greater than the first torque.

The above summary is provided merely for purposes of summarizing some example embodiments to provide a basic understanding of some aspects of the present disclosure.

Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject matter will become apparent from the description, the drawings, and the claims.

BRIEF DESCRIPTION OF THE DRAWINGS

Figure 1:
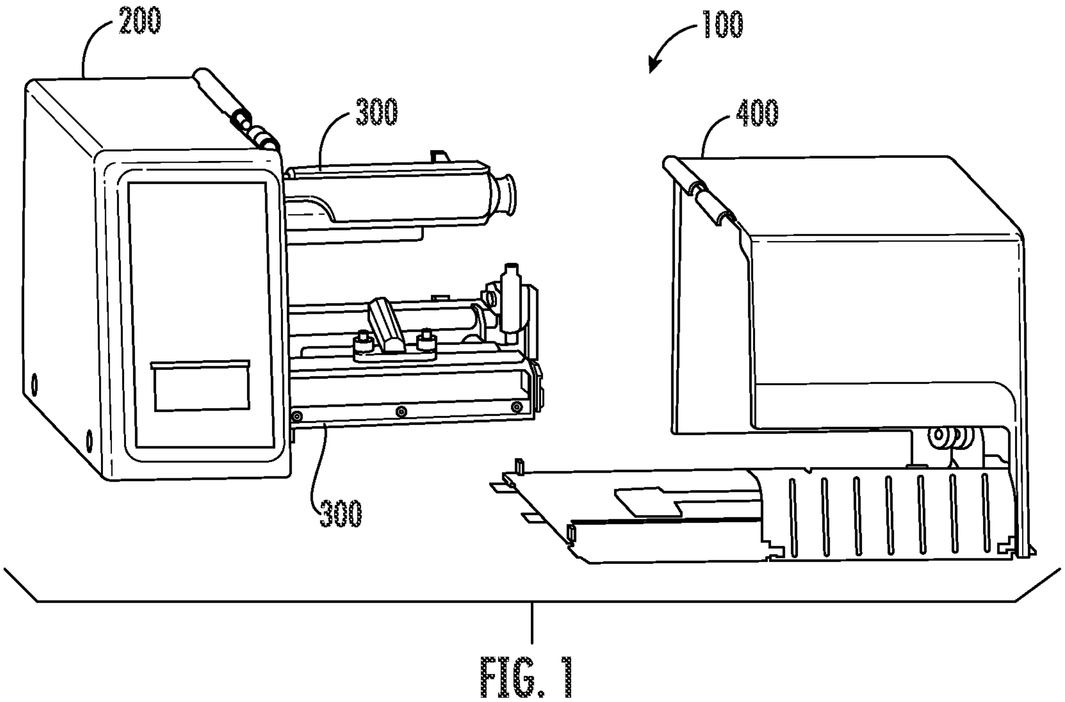

Having thus described certain example embodiments of the present disclosure in general terms above, non-limiting and non-exhaustive embodiments of the subject disclosure are described with reference to the following figures, which are not necessarily drawn to scale and wherein like reference numerals refer to like parts throughout the various views unless otherwise specified. The components illustrated in the figures may or may not be present in certain embodiments described herein. Some embodiments may include fewer (or more) components than those shown in the figures.

FIG. 1 provides an exploded perspective view of a printer assembly, in accordance with an example embodiment.

Figure 2:
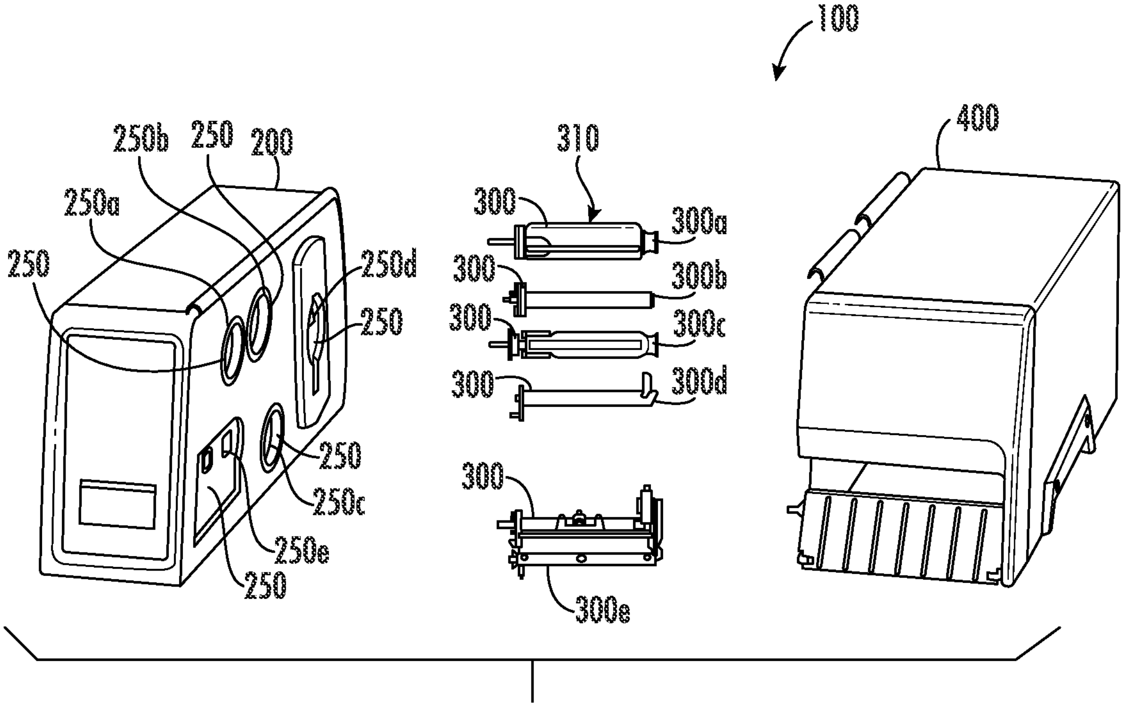

FIG. 2 provides an exploded perspective view of the printer assembly of FIG. 1, in accordance with an example embodiment.

Figure 3:
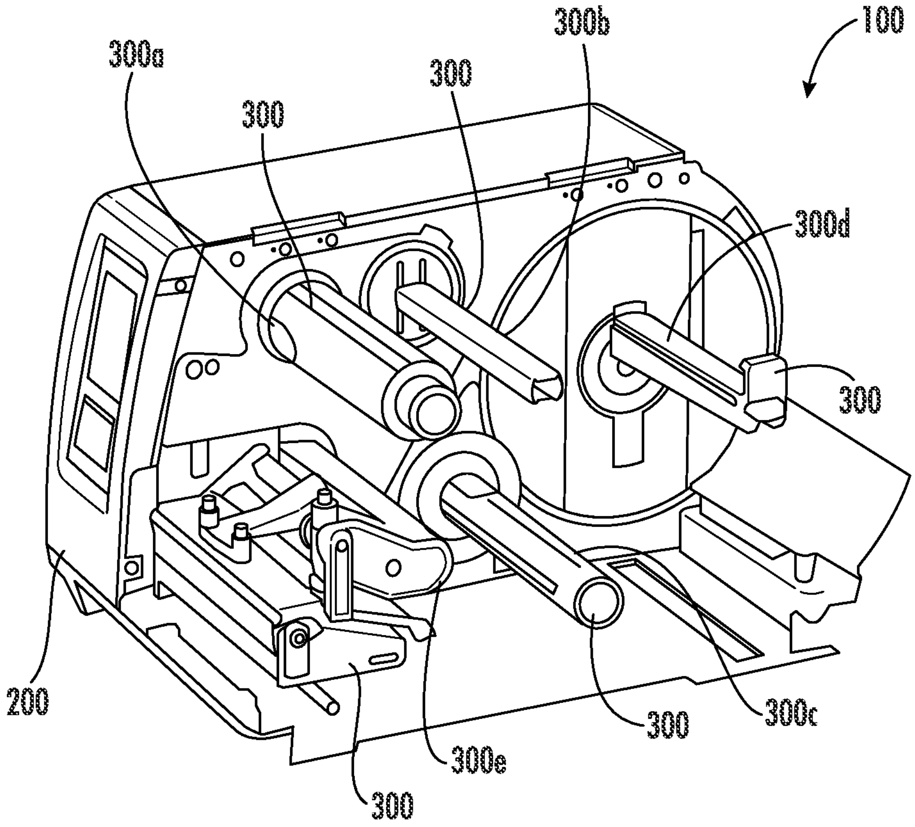

FIG. 3 provides a perspective view of a portion of the printer assembly of FIG. 1, in accordance with an example embodiment.

Figure 4A:
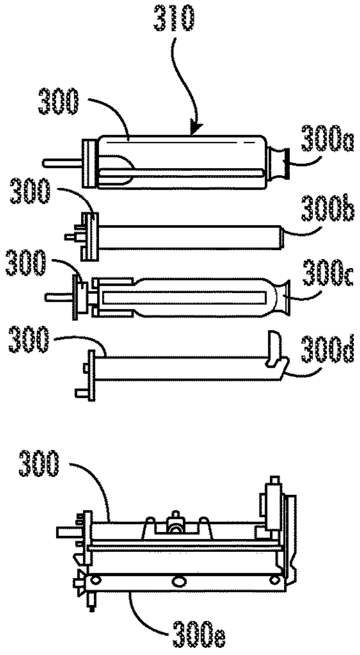

FIG. 4*a* provides a perspective view of a first set of drive components for the printer assembly of FIG. 1, in accordance with an example embodiment.

Figure 4B:
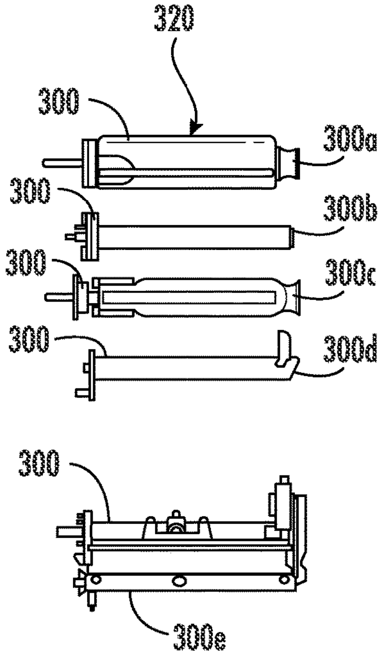

FIG. 4*b* provides a perspective view of a second set of drive components for the printer assembly of FIG. 1, in accordance with an example embodiment.

Figure 4C:
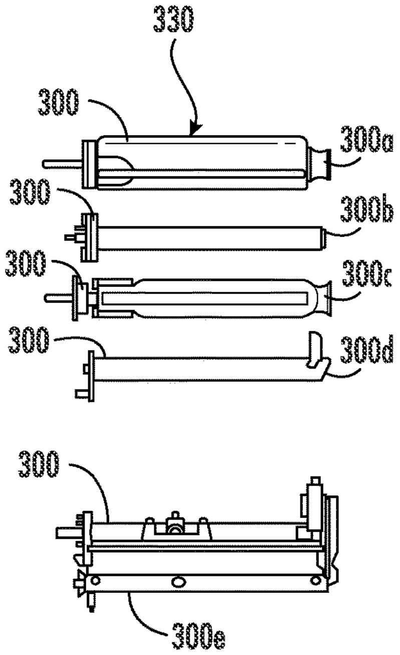

FIG. 4*c* provides a perspective view of a third set of drive components for the printer assembly of FIG. 1, in accordance with an example embodiment.

Figure 5A:
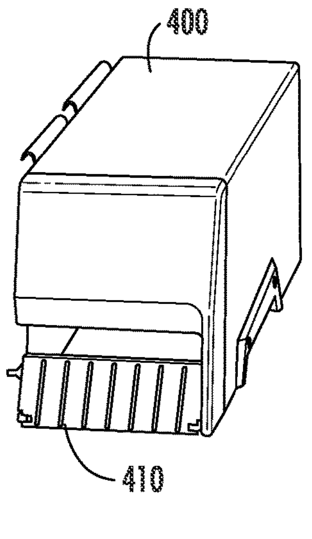

FIG. 5*a* provides a perspective view of a first cover for the printer assembly of FIG. 1, in accordance with an example embodiment.

Figure 5B:
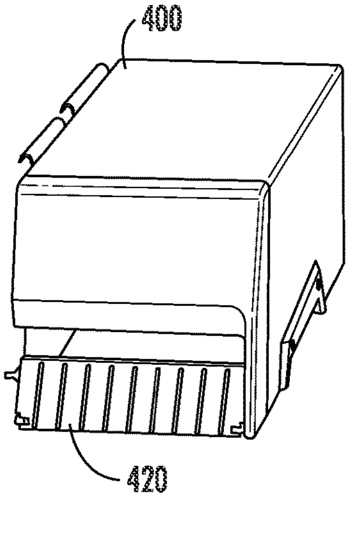

FIG. 5*b* provides a perspective view of a second cover for the printer assembly of FIG. 1, in accordance with an example embodiment.

Figure 5C:
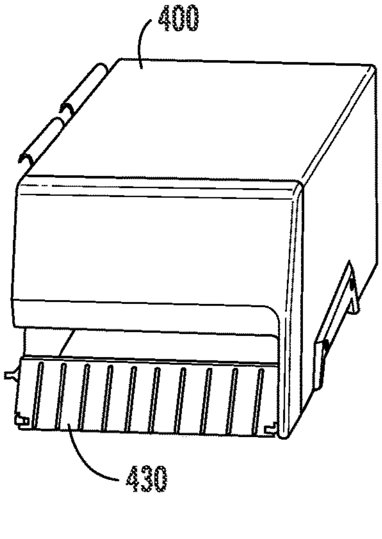

FIG. 5*c* provides a perspective view of a third cover for the printer assembly of FIG. 1, in accordance with an example embodiment.

DETAILED DESCRIPTION

One or more embodiments are now more fully described with reference to the accompanying drawings, wherein like reference numerals are used to refer to like elements throughout and in which some, but not all embodiments of the inventions are shown. In the following description, for purposes of explanation, numerous specific details are set forth in order to provide a thorough understanding of the various embodiments. It is evident, however, that the various embodiments can be practiced without these specific details. It should be understood that some, but not all embodiments are shown and described herein. Indeed, the embodiments may be embodied in many different forms, and accordingly this disclosure should not be construed as limited to the embodiments set forth herein. Rather, these embodiments are provided so that this disclosure will satisfy applicable legal requirements.

As used herein, the term “exemplary” means serving as an example, instance, or illustration. Any aspect or design described herein as “exemplary” is not necessarily to be construed as preferred or advantageous over other aspects or designs. Rather, use of the word exemplary is intended to present concepts in a concrete fashion. In addition, while a particular feature may be disclosed with respect to only one of several implementations, such feature may be combined with one or more other features of the other implementations as may be desired and advantageous for any given or particular application. Furthermore, to the extent that the terms “includes” and “including” and variants thereof are used in either the detailed description or the claims, these terms are intended to be inclusive in a manner similar to the term “comprising.” In addition, the articles “a” and “an” as used in this application and the appended claims should generally be construed to mean “one or more” unless specified otherwise or clear from context to be directed to a singular form.

As used herein, the term “or” is intended to mean an inclusive “or” rather than an exclusive “or”. That is, unless specified otherwise, or clear from context, “X employs A or B” is intended to mean any of the natural inclusive permutations. That is, if X employs A; X employs B; or X employs both A and B, then "X employs A or B" is satisfied under any of the foregoing instances. The term "and/or" is used to emphasize the inclusivity.

As used herein, the terms "coupled," "fixed," "attached to," and the like refer to both direct coupling, fixing, or attaching, as well as indirect coupling, fixing, or attaching through one or more intermediate components or features, unless otherwise specified herein. Further, the term "removably coupled" and the like refer to one component being coupled to another component but being able to be decoupled relatively easily. For example, a component is removably coupled to another component if the component can be decoupled from the other component with the force exerted by a human (e.g., the force exerted by a human hand), with or without the use of a tool (e.g., a screwdriver, a ratchet, or a pry bar).

Referring now to FIG. 1, an exploded perspective view of a printer assembly 100 is provided, in accordance with an example embodiment. In various examples, the printer assembly 100 is configured to print on media, such as paper, labels, tickets, tags, continuous stock, etc., which can be dispensed from a roll. The printer assembly 100 can be configured to use printing ribbon (e.g., thermal transfer ribbon), which can be dispensed from a roll, to print on the media. In other examples, the printer assembly 100 can be configured to use a printer cartridge.

The printer assembly 100 can include a module 200, a plurality of drive components 300, and a cover 400. The module 200 can include electronic hardware and an electric motor (not shown). The electric motor can be configured to rotate at least one of the plurality of drive components 300. In various examples, the electric motor can be configured to rotate two or more of the plurality of drive components 300 by meshing with one or more gears (not shown) to transfer torque to at least one of the two or more drive components 300. The cover 400 can be configured to house the plurality of drive components 300 and can be configured to be removably coupled to the module 200. Also, each of the plurality of drive components 300 can be configured to be removably coupled to the module 200.

Referring now to FIG. 2, an exploded perspective view of the printer assembly 100 of FIG. 1 is provided, in accordance with an example embodiment. As seen in this view, the module 200 can comprise a plurality of ports 250. Each of the drive components 300 can be configured to be removably coupled to a corresponding port 250 of the plurality of ports 250. For example, drive component 300*a* can be configured to be removably coupled to port 250*a*, drive component 300*b* can be configured to be removably coupled to port 250*b*, and so forth.

The plurality of drive components 300 can be a set of drive components 310. For example, the set of drive components 310 can include at least two of drive component 300*a*, drive component 300*b*, drive component 300*c*, drive component 300*d*, or drive component 300*e*.

Referring now to FIG. 3, a perspective view of a portion of the printer assembly 100 of FIG. 1 is provided, in accordance with an example embodiment. In various examples, drive component 300*e* can be a printhead that is configured to use the printing rolls (not shown) to print on the media (not shown); drive component 300*d* can be a hanger that can be configured to feed the media to the printhead; drive component 300*c* can be a spool to rewind the media; drive component 300*b* can be a spool to supply printing ribbon from rolls to the printhead; and drive component 300*a* can be a spool to take up the ribbon from the printhead. Even though drive component 300*d* is shown as a stationary hanger, it should be understood that drive component 300*d* can be a rotational hanger, in various examples.

As mentioned, each drive component 300 (e.g., drive components 300*a*-300*e*) can be removably coupled to the module 200. For example, one or more of the drive components 300 can be configured to assemble and/or fit onto the module 200. In various examples, one or more of the drive components 300 can be configured to be fastened onto the module 200 with a threaded fastener (e.g., a screw). In the example of FIG. 3, drive component 300*e* is configured to be fastened onto the module 200 with a threaded fastener and drive components 300*a-d* are configured to snap onto the module 200.

In various examples, the module 200 can be configured to receive, sense, or determine information related to at least one of the drive components 300. For example, the module 200 can be configured to receive, sense, or determine identifying information (e.g., part number, identification number, serial number, or a stock keeping unit (SKU)) that is associated with at least one of the drive components 300. As another example, the module 200 can be configured to receive, sense, or determine a size (e.g., length, width, or diameter) of the at least one drive component 300.

In various examples, the module 200 can be configured to determine additional information related to the at least one drive component 300 based on the received, sensed, or determined information related to the at least one of the drive components 300. For example, the module 200 can be configured to determine a size of the at least one drive component 300 based on the received, sensed, or determined identifying information (e.g., part number, identification number, serial number, or a stock keeping unit (SKU)). The module 200 can determine the size by referring to a lookup table that includes the length, width, or diameter for each possible identifying information.

The module 200 can be configured to sense, receive, or determine the information related to the at least one drive component 300 by receiving information from a chip (not shown) that is associated with the at least one drive component 300 (e.g., attached to the at least one drive component 300). For example, the drive component 300*e*, which can be configured as a printhead, can include a chip that is configured to communicate with the module 200 by direct contact (e.g., through plated pads that touch contacts on the module 200) or wirelessly (e.g., through radio frequency). The chip can include memory or can be mounted on a circuit board that includes memory to store information (e.g., the information related to or the identifying information for the at least one drive component 300). The chip can include or be linked to a processor.

Referring now to FIGS. 4*a*-4*c*, a perspective view of a first set of drive components 310, a second set of drive components 320, and a second set of drive components 330 for the printer assembly 100 of FIG. 1 is provided, in accordance with an example embodiment. As mentioned, the plurality of drive components 300 can be a set of drive components (e.g., the first set of drive components 310, the second set of drive components 320, or the third set of drive components 330) and can include a plurality of drive components 300 (e.g., drive components 300*a-e*).

As seen in the views of FIGS. 4*a*-4*c*, the length of each drive component 300 of the first set of drive components 310 can be different than the length of each drive component 300 of the second set of drive components 320 and/or the length of each drive component 300 of the third set of drive components 330. For example, the lengths of each drive component 300 of the first set of drive components 310 can differ from the lengths of each drive component 300 of the second set of drive components 320 and/or the third set of drive components 330 by at least half an inch, such as at least one inch, such as at least two inches. For example, the lengths of each of the drive components 300 of the first set of drive components 310 can be about 4 inches (e.g., 3 inches to 5 inches), the lengths of each of the drive components 300 of the second set of drive components 320 can be about 6 inches (e.g., 5 inches to 7 inches), and the lengths of each of the drive components 300 of the third set of drive components 330 can be about 8 inches (e.g., 7 inches to 9 inches).

Referring briefly back to FIG. 2, each of the plurality of ports 250 can be configured to be removably coupled to a corresponding drive component 300 of the first set of drive components 310 and further configured to be removably coupled to a corresponding drive component 300 of the second set of drive components 320 and/or the third set of drive components 330. For example, port 250*a* can be configured to receive and be removably coupled to drive component 300*a* from at least two of the first set of drive components 310, the second set of drive components 320, or the third set of drive components 330. In various examples, port 250*a* can be configured to receive and be removably coupled to drive component 300*a* from the first set of drive components 310, the second set of drive components 320, and the third set of drive components 330. Similarly, ports 250*b-e* can be configured to receive and be removably coupled to a corresponding drive component 300*b-e* from at least two of the first set of drive components 310, the second set of drive components 320, or the third set of drive components 330.

As mentioned, the module 200 can include an electric motor that can be configured to rotate at least one of the plurality of drive components 300. Additionally, as mentioned, the module 200 can be configured to receive, sense, or determine information (e.g., identifying information) related to at least one of the drive components 300. The module 200 can also be configured to adjust the rotational speed and/or torque output by the electric motor based on the received, sensed, or determined information (e.g., the length, width, or diameter of the at least one drive component 300).

For example, the module 200 can be configured to receive, sense, or determine information related to drive component 300*e*, which can be configured as a printhead. Based on the information, the module 200 can adjust the rotational speed and/or torque output by the electric motor that can be configured to rotate the at least one of the other drive components 300*a-d* (e.g., drive component 300*a* and drive component 300*c*) of the plurality of drive components 300. Further, the module 200 can be configured to determine whether the drive component 300*e* is included in the first set of drive components 310, the second set of drive components 320, or the third set of drive components 330.

In various examples, the module 200 is configured to have the motor output a greater torque for a relatively longer drive component 300 than a shorter drive component 300. For example, the module 200 is configured to have the motor output a greater torque for a drive component 300 that is about 6 inches and a lesser torque for a drive component 300 that is about 4 inches.

Referring now to FIGS. 5*a*-5*c*, a perspective view of a first cover 410, a second cover 420, and a third cover 430 for the printer assembly 100 of FIG. 1 are provided, in accordance with an example embodiment. As mentioned, the cover 400 can be configured to house the plurality of drive components 300 and can be configured to be removably coupled to the module 200.

As seen in the views of FIGS. 5*a*-5*c*, the width of the first cover 410 can be different than the width of the second cover 420 and/or the third cover 430. For example, the width of the first cover 410 can differ from the width of the second cover 420 and/or the third cover 430 by at least half an inch, such as at least one inch, such as at least two inches. For example, the width of the first cover 410 can be wide enough to accommodate the drive components 300 of the first set of drive components 310, the second cover 420 can be wide enough to accommodate the drive components 300 of the second set of drive components 320, and the third cover 430 can be wide enough to accommodate the drive components 300 of the third set of drive components 330. In various examples, the width of the first cover 410 can be about 4.5 inches (e.g., 3.5 inches to 5.5 inches), the width of the second cover 420 can be about 6.5 inches (e.g., 5.5 inches to 7.5 inches), and the width of the third cover 430 can be about 8.5 inches (e.g., 7.5 inches to 9.5 inches). In various examples, the module 200 is configured to be removably coupled to at least two of the first cover 410, the second cover 420, or the third cover 430.

As will be appreciated, a common module 200 can be used with two or more of the first set of drive components 310, the second set of drive components 320, and the third set of drive components 330. Additionally, the common module 200 can be used with two or more of the first cover 410, the second cover 420, and the third cover 430. Having a common module 200 may allow for the use of different sized media or printing ribbons with the common module 200. Additionally, having a common module 200 may reduce developmental, production and/or distribution costs associated with the printer assembly 100. For example, the common module 200 can include various components, such as the chassis or connection parts of the circuit board, that can be common and do not need to be redesigned, adjusted, or resized to accommodate the use of different sized media or printing ribbons.

CONCLUSION

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the appended claims below. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A printer assembly comprising:

a module comprising an electric motor and a plurality of ports; and a plurality of drive components, wherein each of the plurality of drive components is configured to be removably coupled to a corresponding port of the plurality of ports, wherein the electric motor is configured to rotate at least one of the plurality of drive components, wherein the module is configured to receive, sense, or determine information related to at least one of the plurality of drive components and configured to adjust at least one of a rotational speed or a torque output by the electric motor based on the information related to the at least one of the plurality of drive components, and wherein the electric motor is configured to rotate a first one of the plurality of drive components and the module is configured to receive, sense, or determine information related to a second one of the plurality of drive components.

2. The printer assembly of claim 1, wherein the second one of the plurality of drive components is a printhead.

3. The printer assembly of claim 2, wherein the module is configured to sense, receive, or determine the information related to the printhead by receiving information from a chip that is attached to the printhead.

4. A printer assembly comprising:

a module comprising an electric motor and a plurality of ports; and a plurality of drive components, wherein each of the plurality of drive components is configured to be removably coupled to a corresponding port of the plurality of ports, wherein the electric motor is configured to rotate at least one of the plurality of drive components, wherein the module is configured to receive, sense, or determine information related to at least one of the plurality of drive components and configured to adjust at least one of a rotational speed or a torque output by the electric motor based on the information related to the at least one of the plurality of drive components, and wherein the information related to the at least one of the plurality of drive components is a length of the at least one of the plurality of drive components.

5. A printer assembly comprising:

a module comprising a plurality of ports; and a first set of drive components, wherein each of the plurality of ports is configured to be removably coupled to a corresponding drive component of the first set of drive components and further configured to be removably coupled to a corresponding drive component of a second set of drive components, and wherein each of the drive components of the first set of drive components have a different size than each of the drive components of the second set of drive components.

6. The printer assembly of claim 5, wherein the module is configured to determine whether a drive component of the first set of drive components is coupled to the module or a drive component of the second set of drive components is coupled to the module.

7. The printer assembly of claim 5, wherein each of the plurality of ports is configured to be removably coupled to the corresponding drive component of the first set of drive components and removably coupled to the corresponding drive component of the second set of drive components at different instances of time.

8. The printer assembly of claim 5, wherein each of the drive components of the first set of drive components has a length that differs from a length of each of the drive components of the second set of drive components by at least one inch.

9. The printer assembly of claim 5, wherein a length of each of the drive components of the first set of drive components is at least three inches and up to five inches and a length of each of the drive components of the second set of drive components is at least five inches and up to seven inches.

10. The printer assembly of claim 9, wherein each of the plurality of ports is further configured to be removably coupled to a corresponding drive component of a third set of drive components, wherein a length of each of the drive components of the third set of drive components is at least seven inches and up to nine inches.

11. The printer assembly of claim 5, wherein the module further comprises an electric motor, wherein the module is configured to cause the electric motor to output a first torque when the first set of drive components is removably coupled to the module and output a second torque when the second set of drive components is removably coupled to the module, wherein the second torque is greater than the first torque.

12. A printer assembly comprising:

a module comprising a plurality of ports;

a first set of drive components; and a first cover removably coupled to the module and configured to house the first set of drive components, wherein each of the plurality of ports is configured to be removably coupled to a corresponding drive component of the first set of drive components and further configured to be removably coupled to a corresponding drive component of a second set of drive components, and wherein each of the drive components of the first set of drive components have a different size than each of the drive components of the second set of drive components.

13. The printer assembly of claim 12, wherein the module is configured to be removably coupled to a second cover, wherein the second cover has a different width than the first cover.

14. The printer assembly of claim 13, wherein the module is configured to be removably coupled to the first cover and to the second cover at different instances of time.

15. The printer assembly of claim 12, wherein the module is configured to determine whether a drive component of the first set of drive components is coupled to the module or a drive component of the second set of drive components is coupled to the module.

16. The printer assembly of claim 12, wherein each of the plurality of ports is configured to be removably coupled to the corresponding drive component of the first set of drive components and removably coupled to the corresponding drive component of the second set of drive components at different instances of time.

17. The printer assembly of claim 12, wherein each of the drive components of the first set of drive components has a length that differs from a length of each of the drive components of the second set of drive components by at least one inch.

18. The printer assembly of claim 12, wherein a length of each of the drive components of the first set of drive components is at least three inches and up to five inches and a length of each of the drive components of the second set of drive components is at least five inches and up to seven inches.

19. The printer assembly of claim 12, wherein the module further comprises an electric motor, wherein the module is configured to cause the electric motor to output a first torque when the first set of drive components is removably coupled to the module and output a second torque when the second set of drive components is removably coupled to the module, wherein the second torque is greater than the first torque.

* * * * *